(12) United States Patent
Sadeh-Shirazi et al.

(10) Patent No.: US 10,009,203 B1
(45) Date of Patent: Jun. 26, 2018

(54) SMALL-FOOTPRINT DIGITAL RECEIVER FOR EXTRACTING NARROWBAND FREQUENCY-SLICES

(71) Applicant: CAPACICOM LTD., Kfar Netter (IL)

(72) Inventors: Avihay Sadeh-Shirazi, Tel Aviv (IL); Ronen Mayrench, Raanana (IL); Iddo Peled, Tel-Aviv (IL); Nitzan Ron, Zichron Yaakov (IL); Naor Goldman, Ein-Vered (IL); Daniel Wajcer, Beit-Yehoshua (IL)

(73) Assignee: CAPACICOM LTD., Kfar Netter (IL)

( * ) Notice: Subject to any disclaimer, the term of this patent is extended or adjusted under 35 U.S.C. 154(b) by 0 days. days.

(21) Appl. No.: 15/613,293

(22) Filed: Jun. 5, 2017

(51) Int. Cl.
 H04L 27/22 (2006.01)
 H04L 27/233 (2006.01)
 H04L 27/148 (2006.01)
 H04L 29/06 (2006.01)

(52) U.S. Cl.
 CPC ........ H04L 27/2334 (2013.01); H04L 27/148 (2013.01); H04L 27/22 (2013.01); H04L 29/06578 (2013.01)

(58) Field of Classification Search
 CPC .................. H04L 27/23334; H04L 27/148
 See application file for complete search history.

(56) References Cited

U.S. PATENT DOCUMENTS

| | | | |
|---|---|---|---|
| 6,324,222 | B1 | 11/2001 | Choi et al. |
| 7,145,972 | B2 | 12/2006 | Kumar et al. |
| 7,394,871 | B2 | 7/2008 | Zhang et al. |

OTHER PUBLICATIONS

DOCSIS 2.0, "Data-Over-Cable Service Interface Specifications, Radio Frequency Interface Specification", 499 pages, Apr. 22, 2009.
Harris et al., "Polyphase analysis filter bank down-converts unequal channel bandwidths with arbitrary center frequencies", Analog Integrated Circuits and Signal Processing, vol. 71, issue 3, pp. 481-494, Jun. 2012.
Awan et al., "Polyphase Filter Banks for Embedded Sample Rate Changes in Digital Radio Front-Ends", ZTE Communications, vol. 9, No. 4, 7 pages, Dec. 2011.
Harris et al., "On Multi-Channel Receivers with Arbitrary, Uncoupled Selection of Channel Spacing, Channel Bandwidth, and Channel Sample Rate", published in Research Laboratory of the National Telecommunications and Information Administration, 1 page, Jan. 14, 2002.

(Continued)

*Primary Examiner* — Jaison Joseph
(74) *Attorney, Agent, or Firm* — D. Kliger IP Services Ltd.

(57) ABSTRACT

A digital receiver includes a memory buffer and circuitry. The memory buffer stores samples of an input signal having a sampling rate Fsi. The circuitry includes P filter-families that each includes N filters derived from a prototype Low-Pass Filter (LPF) whose stopband frequency depends on an output sampling rate Fso=α·Fsi. The circuitry is configured to set a sampling time according to Fso, to select, based on the sampling time, multiple filter-families out of the P filter-families, and to construct, based on the N filters in each of the selected filter-families, N interpolated filters that are each aligned to the sampling time. The circuitry is further configured to calculate N filtered samples by applying the N interpolated filters to the samples in the memory buffer, and to generate a sample for an output signal of a frequency-slice of the input signal, by digitally down-converting the N filtered samples.

16 Claims, 3 Drawing Sheets

(56) References Cited

OTHER PUBLICATIONS

Harris et al., "Performing Simultaneous Arbitrary Spectral Translation and Sample Rate Change, in Polyphase Interpolating or Decimating Filters in Transmitters and Receivers", Wireless Innovation Forum, 6 pages, Sep. 13, 2002.
Harris et al., "Digital Receivers and Transmitters Using Polyphase Filter Banks for Wireless Communications", IEEE Transactions on Microwave Theory and Techniques, vol. 51, issue 4, pp. 1395-1412, Apr. 2003.
Harris et al., "Polyphase Channelizer Performs Sample Rate Change Required for both Matched Filtering and Channel Frequency Spacing", Asilomar Conference on Signals, Systems, and Computers, pp. 1283-1287, year 2009.
Chen et al., "Non-maximally decimated filter bank-based single-carrier receiver: a pathway to next-generation wideband communication", EURASIP Journal on Advances in Signal Processing, Issue 62, 15 pages, year 2014.

SMALL-FOOTPRINT DIGITAL RECEIVER FOR EXTRACTING NARROWBAND FREQUENCY-SLICES

TECHNICAL FIELD

Embodiments described herein relate generally to communication systems, and particularly to methods and systems for processing broadband signals in digital receivers.

BACKGROUND

In various communication systems, such as in wireless or cable communications, a receiver processes a broadband signal such as a multi-channel signal.

Methods for processing broadband signals are known in the art. For example, an article titled "Polyphase Filter Banks for Embedded Sample Rate Changes in Digital Radio Front-Ends," ZTE communications, December 2011, volume 9, number 4, which is incorporated herein by reference, describes processing engines for Software-Defined Radio (SDR) front-ends. These engines, which are based on a Polyphase channelizer, perform arbitrary sample-rate changes, frequency selection, and bandwidth control. The article presents an M-path Polyphase filter bank that is based on a modified N-path Polyphase filter. Such a system allows resampling by arbitrary ratios while performing baseband aliasing from center frequencies at Nyquist zones that are not multiples of the output sample rate.

U.S. Pat. No. 7,394,871, whose disclosure is incorporated herein by reference, describes a digital multi-channel demodulator circuit. The demodulator includes a frequency-block down-converter that shifts a received multi-channel analog RF signal to a lower frequency band. An Analog to Digital Converter (ADC) receives the multi-channel analog RF signal from the frequency-block down-converter and converts the multi-channel analog RF signal to a multi-channel digital RF signal. A digital channel de-multiplexer receives the multi-channel digital RF signal from the ADC and de-multiplexes the multi-channel digital RF signal into separate digital RF channels.

SUMMARY

An embodiment that is described herein provides a digital receiver that includes a memory buffer and circuitry. The memory buffer stores samples of an input signal having a sampling rate Fsi. The circuitry includes P filter-families that each includes N filters derived from a prototype Low-Pass Filter (LPF) whose stopband frequency depends on an output sampling rate $Fso=\alpha \cdot Fsi$. The circuitry is configured to set a sampling time according to Fso, to select, based on the sampling time, multiple filter-families out of the P filter-families, and to construct, based on the N filters in each of the selected filter-families, N interpolated filters that are each aligned to the sampling time. The circuitry is further configured to calculate N filtered samples by applying the N interpolated filters to the samples in the memory buffer, and to generate a sample for an output signal of a frequency-slice of the input signal, by digitally down-converting the N filtered samples.

In some embodiments, the circuitry is configured to compute coefficients of the N interpolated filters (i) after setting the sampling time and (ii) as a function of the sampling time. In other embodiments, $\alpha$ is an irrational number. In yet other embodiments, $\alpha$ equals a rational number P1/Q1, P1 and Q1 being integer numbers, and P1 is different from P.

In an embodiment, the circuitry is configured to generate N samples of respective N frequency-slices each centered at a frequency $k \cdot Fsi/N$, k being an integer in a range $0 \ldots N-1$, by producing N cyclically-shifted samples from the N filtered samples, and down-converting the N cyclically-shifted samples to baseband. In another embodiment, the circuitry is configured to produce the N cyclically-shifted samples by calculating a cyclic shift value as a function of the sampling time.

In some embodiments, the circuitry is configured to construct the N interpolated filters by selecting first and second filter-families corresponding to first and second sampling times that respectively occur before and after the sampling time. In other embodiments, the circuitry is configured to construct the N interpolated filters by interpolating between coefficients of the respective N filters in each of the first and second filter-families, depending on an offset of the sampling time from the first sampling time.

There is additionally provided, in accordance with an embodiment that is described herein, a method, including, storing samples of an input signal in a memory buffer of a digital receiver. The digital receiver includes P filter-families that each includes N filters. The N filters are derived from a prototype Low-Pass Filter (LPF) whose stopband frequency depends on a predefined output sampling rate Fso, given by $Fso=\alpha \cdot Fsi$, Fsi is a sampling rate of the input signal to the digital receiver, and $\alpha$ being a predefined rate-conversion ratio. A sampling time is set, by the digital receiver, according to the output sampling rate Fso. Based on the sampling time, two or more filter-families are selected out of the P filter-families, and based on the N filters in each of the two or more filter-families respective N interpolated filters that are each aligned to the sampling time are constructed. N filtered samples are calculated by applying the N interpolated filters to at least some of the samples in the memory buffer. A sample is generated for an output signal of a frequency-slice of the input signal, by digitally down-converting the N filtered samples.

These and other embodiments will be more fully understood from the following detailed description of the embodiments thereof, taken together with the drawings in which:

DETAILED DESCRIPTION OF EMBODIMENTS

Overview

In various communication and signal-processing applications, a broadband signal is processed for extracting one or more frequency bands of interest. The broadband signal is typically sampled at a high sampling rate.

Embodiments that are described herein provide improved methods and systems for processing a broadband signal. In the disclosed embodiments, a digital receiver extracts from a broadband signal X(n) one or more frequency-slices. The sampling rates of the input and output signals are denoted Fsi and Fso, respectively, and the rate-conversion ratio Fso/Fsi is denoted $\alpha$. In the disclosed embodiments $\alpha$ is a predefined arbitrary number.

In principle, extracting a frequency-slice centered at a frequency Fc can be carried out by down-converting X(n) from Fc to baseband and filtering the down-converted signal to retain the desired slice bandwidth using a suitable Low-Pass Filter (LPF) and down sampling the filtered signal from Fsi to Fso. In some disclosed embodiments, the digital receiver simultaneously extracts, from the input signal, N frequency-slices centered at frequencies that are multiples of Fsi/N, and having a slice bandwidth Fso.

In some embodiments, the digital receiver employs an efficient architecture that is based on Polyphase decomposition. The digital receiver comprises a Polyphase filter bank that comprises N interpolated sub-filters, which are re-calculated (or selected) on-the-fly for generating each output sample. The digital receiver stores samples of the input signal in a memory buffer, organized in a two-dimensional (2D) array of N rows. Each row is associated with a respective interpolated sub-filter of the Polyphase filter bank. The digital receiver further comprises P filter-families that each comprises N family sub-filters. All of the N family sub-filters in all of the filter-families are typically derived from a common prototype Low-Pass Filter (LPF) whose stopband frequency typically depends on the output sampling rate Fso. The family sub-filters of the filter-families are used for calculating the interpolated sub-filters as will be described below.

In the description that follows we assume that the prototype LPF can be modelled as having a low-attenuation passband, and a high-attenuation stopband. The frequency-range of the passband is zero to a predefined passband frequency and the frequency-range of the stopband is above a predefined stopband frequency that is larger than the passband frequency. The frequency-range between the passband and stopband frequencies is also referred to as a transition band. The passband and stopband frequencies, as well as the maximal attenuation over the passband range and the minimal attenuation over the stopband range are application-dependent design parameters.

To produce output samples at the Fso rate, the digital receiver determines sampling times $Tm=m \cdot Tsi/\alpha$, wherein $Tsi=1/Fsi$ is the input sampling interval. Based on the sampling time, the digital receiver selects two or more filter-families out of the P filter-families, and based on the N sub-filters in each of the two or more filter-families constructs respective N interpolated sub-filters that are each aligned to the sampling time.

The digital receiver applies the N interpolated sub-filters to the samples in the memory buffer to produce N filtered samples, applies to the filtered samples a cyclic shift that depends on the sampling time, and further applies to the cyclically shifted samples an N-point Inverse Fast Fourier Transform (IFFT) to produce N samples of the respective N frequency-slices. The cyclic shift is required for aligning the N filtered samples to the IFFT inputs that have a fixed order.

In some embodiments, the P filter-families correspond to respective P sub-intervals of the input sampling interval Tsi. In some embodiments, the resulting N interpolated sub-filters approximate sub-filters of a Polyphase filter bank that are aligned to a sampling time Tm falling inside such a sub-interval, i.e., when $\alpha$ is an irrational number or when $\alpha=P1/Q1$, wherein P1 and Q1 are coprime integers (i.e., the only positive integer that divides both P1 and Q1 is 1) and P1 is different from P. Note that when $\alpha$ is a rational number given by the expression $\alpha=P/Q$ (P is the number of filter-families), the sampling time falls at the edge of a sub-interval. In such a case one of the P filter-families is already aligned to the sampling time, and no interpolation is required.

Selecting the value of P enables a design tradeoff between accuracy and memory size. A higher P value results in a more accurate approximation of the interpolated sub-filters for the actual sampling time, but requires a larger storage area, and vice versa. This tradeoff applies to both irrational values of $\alpha$ and to rational values of $\alpha$ that is defined as a ratio between two large coprime integers.

Consider, for example, a rational $\alpha$ that is given by $\alpha=P1/Q1$, wherein P1 and Q1 are relatively large integers and wherein P1 and Q1 are coprime. In this case, the digital receiver may be designed with only P filter-families, wherein P is much smaller than P1, therefore reducing the required storage area considerably. In general, for a given ratio $\alpha=P1/Q1$, when possible, the receiver should be designed with P=P1 and Q=Q1. If, however, P1 and Q1 are large integers, the receiver can be alternatively designed by selecting $\alpha=(P/Q)\approx(P1/Q1)$, wherein P<P1 and Q<Q1. Note that in this case larger P typically results in better approximation for the Polyphase interpolated sub-filters.

System Description

Figure 1:
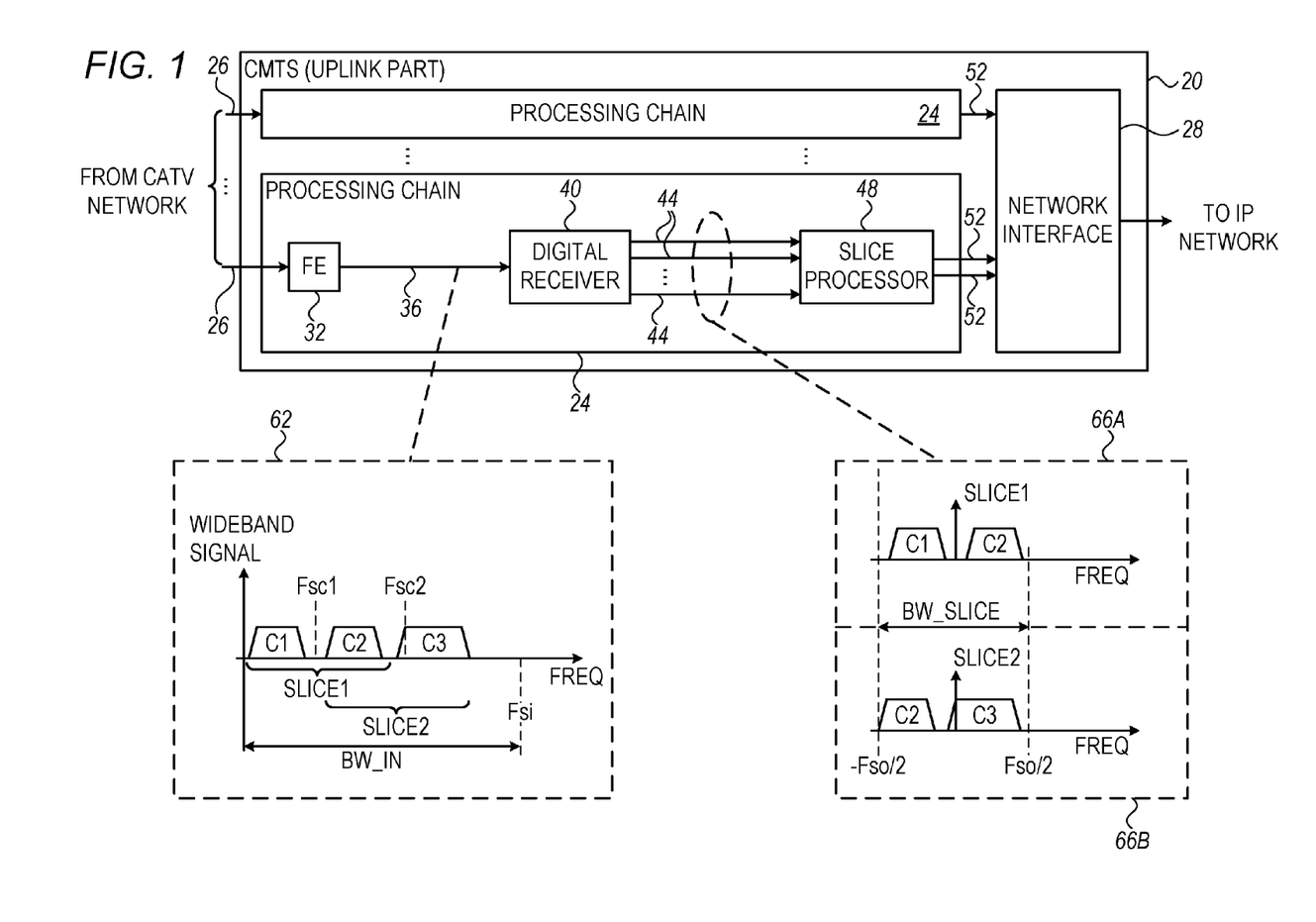
FIG. 1 is a block diagram that schematically illustrates an uplink part of a Cable Modem Termination System (CMTS), in accordance with an embodiment that is described herein.

FIG. 1 is a block diagram that schematically illustrates an uplink part of a Cable Modem Termination System (CMTS) 20, in accordance with an embodiment that is described herein. CMTS 20 is typically located in a cable company's headend or hub-site, and provides high speed data services, such as cable Internet or Voice over Internet Protocol (VOIP), to cable subscribers.

For providing Internet and other IP-based services to cable subscribers, CMTS 20 connects to a Cable Television (CATV) network to which the cable subscribers are connected on one side, and to an IP network such as the Internet on the other side.

The CATV network may comprise, for example, a Hybrid Fiber-Coaxial (HFC) system that combines optical fiber and coaxial cable. The CATV network typically extends from the CMTS, possibly via regional headend units, to a neighborhood's local hub-site, and finally to a coaxial cable node, which typically serves several thousand homes.

In some applications, upstream data that is transmitted from the subscriber via the CMTS toward the IP network is carried in Ethernet frames encapsulated in Data-Over-Cable Service Interface Specifications (DOCSIS) frames. Upstream data is modulated using a suitable modulation scheme such as QPSK or QAM and transmitted using time and/or frequency sharing mechanisms. The bandwidth occupied by the upstream data depends on the underlying protocols. In the DOCSIS 2.0 protocol, for example, the upstream bandwidth is between 5 MHz and 42 MHz. The DOCSIS 2.0 protocol is specified, for example, in "Data-Over-Cable Service Interface Specifications, DOCSIS 2.0, Radio Frequency Interface Specification," Apr. 22, 2009, which is incorporated herein by reference.

CMTS 20 comprises one or more processing chains 24 that each receives an analog broadband signal 26 from the CATV network, extracts subscriber data from the broadband signal and transmits the extracted subscriber data to the IP network via a network interface 28. Broadband signal 26 is typically an Intermediate Frequency (IF) signal that comprises In-phase and Quadrature (IQ) components. Processing chain 24 comprises a Front End (FE) module 32, a digital receiver 40 and a slice processor 48.

FE module 32 converts broadband signal 26 into a digital signal 36 by digitizing the broadband signal into a sequence of digital samples using an Analog to Digital Converter (ADC) (not shown). When broadband signal 26 is an IF signal, the ADC outputs digital samples that are complex-valued. The ADC may output the digital samples at any suitable resolution such as, for example, 12 bits or 14 bits per sample. FE module 32 may sample broadband signal 26 at any suitable rate, such as a suitable sampling rate above the Nyquist rate of signal 26. In CATV applications, FE module 32 typically samples broadband signal 26 at a rate above 42 MHz samples per second, e.g., 50 MHz.

Digital receiver 40 receives digital signal 36 from FE module 32 and extracts from the digital signal one or more slice-signals 44 that each comprises a respective frequency-slice down-converted to baseband and down-sampled. The bandwidth occupied by slice-signals 44 is typically much narrower than the bandwidth of broadband signal 26, and therefore slice-signals 44 can be sampled at a much lower rate than broadband signal 26. Let Fsi and Fso denote the sampling rate of broadband signal 26 and slice-signals 44, respectively. In the present example, the digital receiver reduces the sampling rate of broadband signal 26, i.e., Fso<Fsi.

Slice processor 48 further processes slice-signals 44 to demodulate intra-slice frequency sub-bands of the frequency-slices into one or more bit-streams 52. Note that since in the present example Fso<Fsi, slice processor 48 operates at a rate that is much lower than would be required for processing broadband signal 26 (or digital signal 36) directly. The architecture of processing chain 24 is therefore advantageous in terms of processing power, complexity, silicon area and generated heat.

In the present example, network interface 28 encapsulates bit-streams 52 in IP packets in accordance with a suitable protocol and transmits the IP packets to the IP network, e.g., using a Network Interface Controller (NIC) (not shown). Network interface 28 may encapsulate one or more bit-streams 52 for transmission to a common destination over the IP network. Alternatively, network interface transmits bit streams 52 to any other suitable network operating in accordance with any suitable protocols.

The lower part of FIG. 1 depicts an example broadband signal 26 in a frequency-domain view 62, and corresponding frequency-slices generated by the digital receiver in frequency-domain views 66A and 66B. In the present example, broadband signal 26 comprises three channels denoted C1, C2 and C3, wherein C1 and C2 have the same bandwidth, which is smaller than the bandwidth of C3. In the figure, SLICE1 and SLICE2 denote two frequency-slices of interest, wherein SLICE1 contains C1 and C2, and SLICE2 contains C2 and C3.

In the example of FIG. 1, two of slice-signals 44 that are generated by digital receiver 40 correspond to SLICE1 and SLICE2. In FIG. 1, the bandwidth of broadband signal 26 is denoted BW_IN, and the bandwidth of slices SLICE1 and SLICE2 is denoted BW_SLICE. As seen in the figure, BW_IN=Fsi and BW_SLICE=Fso, wherein BW_SLICE is much narrower than BW_IN.

The ratio between the output and input sampling rates is denoted $\alpha$, i.e., Fso=$\alpha$·Fsi, wherein in the disclosed embodiments $\alpha$ is an arbitrary number. In some embodiments, Fso can be represented as a rational multiple of Fsi, i.e., Fso=Fsi·(P/Q), wherein P and Q are integers, i.e., $\alpha$=P/Q is a rational number, and P and Q are coprime integers, i.e., the only positive integer that divides both P1 and Q1 is 1. In other embodiments, $\alpha$ is an irrational number.

Consider, for example, an input signal having a sampling rate of 37 MHz that contains multiple channels having a symbol rate of 3 Mbaud (the term "baud" means symbols per second). In some applications, symbols at the output of the digital receiver should contain $2^k$ samples per symbol, k being an integer. Equivalently, Fso is required to be a power of 2 of the symbol rate. Assuming, for example, that Fso equals $2^2$=4 times the symbol rate, Fso=3·4=12 MHz, and the integers P and Q can be selected as P=12 and Q=37, so that Fso=Fsi·(12/37). As will be described below, in some efficient receiver architectures, storage space increases with P, and therefore P should be selected as small as possible.

Efficient Digital Receiver Architecture

Figure 2:
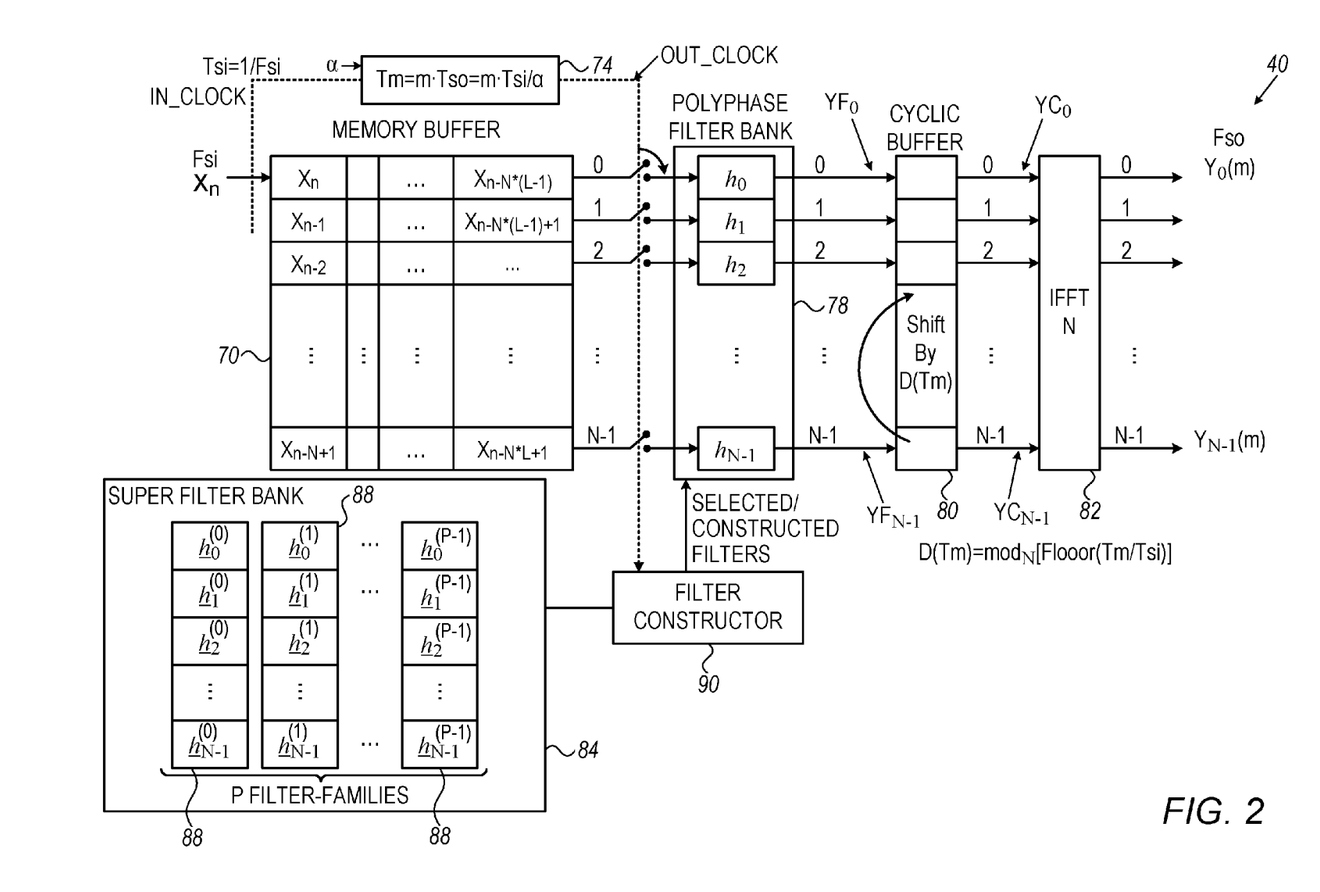
FIG. 2 is a block diagram that schematically illustrates a digital receiver that extracts multiple frequency-slices at an arbitrary sampling rate, in accordance with an embodiment that is described herein.

FIG. 2 is a block diagram that schematically illustrates digital receiver 40 that extracts multiple frequency-slices at an arbitrary sampling rate, in accordance with an embodiment that is described herein. The digital receiver can be used, for example, in processing chain 24 of CMTS 20 of FIG. 1.

The digital receiver receives an input signal X(n) having an input sampling rate Fsi, and outputs N signals $Y_0(m) \ldots Y_{N-1}(m)$ at an output sampling rate Fso. X(n) can be provided to the digital receiver, for example, by FE module 32. The time interval between consecutive samples of X(n) is denoted Tsi, wherein Tsi=1/Fsi. The ratio $\alpha$=Fso/Fsi is a predefined arbitrary number that can be an irrational number.

In the present example, the digital receiver extracts from the input signal N frequency-slices having center frequencies at integer multiples of Fsi/N, and a slice bandwidth Fso. The number of frequency-slices N and the sampling rates Fsi and Fso are design parameters that are application-dependent. In data over cable applications, in an example embodiment, the number of slices N can be 32, the input sampling rate can be 50 MHz and the slice bandwidth can be 10 MHz. Other applications, such as, for example, medical or other imaging applications, may require hundreds or even thousands of frequency-slices. In other embodiments, other suitable input sampling rate, output sampling rate and a number of frequency-slices can also be used.

Digital receiver 40 comprises a memory buffer 70 for storing samples of the input signal X(n). In the example of FIG. 2, memory buffer 70 stores N·L samples, wherein L is a filter length as will be described below. Memory buffer 70 is organized as a two-dimensional array of N rows and L columns. The concatenation of the columns forms a linear array that stores the samples of X(n) sequentially. The leftmost column stores $[X_n, X_{n-1}, \ldots, X_{n-N+1}]$, the following column stores the samples $[X_{n-N}, X_{n-N-1}, \ldots, X_{n-2N+1}]$, and so on. Along each row, the time interval between consecutive samples is given by N·Tsi.

The memory buffer operates in a First-In First-Out (FIFO) mode. When the digital receiver receives one or more (e.g., n1) samples of the input signal X(n), the content of the memory buffer is moved n1 positions so that the n1 least recent samples are discarded, and the received n1 samples are stored starting at the upper sample of the leftmost column. In an embodiment, for flexible management of memory buffer 70, the memory buffer comprises an additional storage space (not shown) for one or more samples of X(n) in addition to the N·L samples is the 2D array. In some embodiments, memory buffer 70 comprises a Random Access Memory (RAM), and managing the memory buffer as a 2D array FIFO is implemented using pointers to relevant memory addresses. For example, the pointers may hold starting addresses of the rows, columns or both.

Digital receiver 40 comprises a sampler 74 that receives an input clock signal denoted IN_CLOCK having a clock period Tsi, and outputs an output clock signal denoted OUT_CLOCK having a period Tso=1/Fso. Sampler 74 determines a sampling time denoted Tm for generating an output sample for the outputs $Y_k(m)$, k=0 . . . N−1, as given by:

$$Tm = m \cdot Tso = m \cdot \frac{Tsi}{\alpha} \qquad \text{Equation 1}$$

In some embodiments, sampler 74 is preconfigured with the desired ratio α between Fso and Fsi, and generates the output clock signal from the input clock signal using Phase Locked Loop (PLL) techniques. In alternative embodiments, both clock signals at the Fsi and Fso rates are derived from a common high-resolution master clock, using respective dedicated PLLs.

Digital receiver 40 further comprises a Polyphase filter bank 78 comprising N sub-filters denoted $h_0 \ldots h_{N-1}$, which are also referred to herein as "interpolated sub-filters." For each sampling time Tm determined by sampler 74, the digital receiver calculates the coefficients of the interpolated sub-filters $h_0 \ldots h_{N-1}$, as will be described below. Each of the N interpolated sub-filters is associated with a respective row in memory buffer 70. The interpolated sub-filters are applied to the samples of the respective rows by calculating the convolutions:

$$YF_j(m) = \sum_{i=0}^{L-1} h_j(i) \cdot X(n_m - j - i \cdot N), \, j = 0, \ldots, N-1. \qquad \text{Equation 2a}$$

wherein $n_m$ is given by:

$$n_m = \text{Floor}\left(\frac{m}{\alpha}\right). \qquad \text{Equation 2b}$$

The outputs of the N interpolated sub-filters are fed into a cyclic buffer 80, which stores the N filtered samples $YF_j(m)$ with a cyclic shift of D(Tm) positions. The cyclically shifted version of $YF_j(m)$ is denoted $YC_j(m)$, j=0 . . . N−1. The shift value D(Tm) depends on the sampling time Tm of Equation 1, and is given by:

$$D(Tm) = \text{mod}_N\left[\text{Floor}\left(\frac{Tm}{Tsi}\right)\right] = \text{mod}_N\left[\text{Floor}\left(\frac{m}{\alpha}\right)\right] = \text{mod}_N[n_m] \qquad \text{Equation 3}$$

Alternatively, variants of Equation 3 can also be used. For example, D(Tm) can be calculated using a variant of Equation 3 in which $n_m$=Floor[m/α]+d, for adding a time delay given by d·Tsi, corresponding to the time duration of "d" consecutive input symbols. As another example, D(Tm) in Equation 3 can be replaced by the expression $D(Tm)=\text{mod}_N[\text{Floor}(m/\alpha)+\varphi]$, (wherein "φ" is a positive integer) to add a phase φ·k/(2·π) for each frequency-slice k=0 . . . N−1.

A filtered output $YF_j(m)$ will be shifted to $YC_i(m)$ so that the index translation is given by:

$$i=\text{mod}_N[j+D(Tm)] \qquad \text{Equation 4:}$$

The filtered and cyclically shifted samples $YC_i(m)$ are input to an N-point Inverse Fast Fourier Transform (IFFT) module 82, which outputs signals of N frequency-slices down-converted from respective center frequencies k·Fsi/N to baseband.

$$Y_k(m) = \sum_{i=0}^{N-1} YC_i(m) \cdot \exp\left(j2\pi \cdot \frac{k}{N} \cdot i\right), k = 0 \ldots N-1. \qquad \text{Equation 5}$$

Alternatively, module 82 can implement other suitable types of time-frequency transforms. For example, based on known mathematical relationships between the Fast Fourier Transform (FFT) and the IFFT, IFFT module 82 can be replaced, mutatis mutandis, with a module that applies FFT, instead.

It can be shown that for the case P=1, i.e., α=1/Q, by designing a suitable prototype Low-Pass Filter (LPF) H and defining the sub-filters $h_i$ as Polyphase decomposition sub-filters of H, i.e., $h_i$=H[i, i+N, i+2N, . . . ], i=0 . . . N−1, the architecture of digital receiver 40 with unchanging filters $h_i$, efficiently implements a multi-channel receiver that simultaneously extracts from X(n) N frequency-slices down-converted to baseband and down-sampled to Fso as described above. Extending the architecture for P>1 and for arbitrary α will be described below.

As noted above, for arbitrary rate-conversion ratio α, the interpolated sub-filters in Polyphase filter bank 78 are determined per each sampling time Tm. To this end, digital receiver 40 comprises a super filter bank 84 that comprises P filter-families 88. Each of the filter-families comprises N family sub-filters, denoted (for the $p^{th}$ filter family) $\underline{h}_0^{(p)} \ldots \underline{h}_{N-1}^{(p)}$.

Consider now a rational rate-conversion ratio, i.e., α can be represented as a rational number of the form P/Q, wherein P and Q are coprime integers. Let Hprototype denote a Low-Pass Filter (LPF) having a normalized stopband frequency 1/(2·Q), and wherein Hprototype comprises N·L·P coefficients. The $p^{th}$ filter-family is derived by taking every $P^{th}$ coefficient of Hprototype starting at p as given by:

$$h^{(p)}=\text{Hprototype}[p,p+P,\ldots,p+(L\cdot N-1)\cdot P],$$

$$p=0\ldots P-1 \qquad \text{Equation 6:}$$

Filter-family $h^{(p)}$ in Equation 6 comprises L·N coefficients, and is decomposed into the respective N family sub-filters of the $p^{th}$ filter-family using Polyphase decomposition, i.e., the $i^{th}$ family sub-filter comprises every $N^{th}$ coefficient starting with the $i^{th}$ coefficient of $h^{(p)}$.

The prototype filter Hprototype is described with a sampling rate that is P times higher than the sampling rate of X(n). Therefore, the N family sub-filters of the $p^{th}$ filter-family are aligned to a fractional time residual Tsi*p/P. Note that an additional delay may be included by choosing a phase p' different from p. In this case, the family sub-filters of the $p^{th}$ filter-family are aligned to a fractional time residual Tsi*p'/P, wherein p' is some integer in the range 0 . . . (P−1).

A filter constructor 90 calculates the N interpolated sub-filters of Polyphase filter bank 78 by selecting one of the filter-families, or by calculating the interpolated sub-filters of the Polyphase filter bank based on multiple selected filter-families. When α is a rational number P/Q, filter constructor 90 selects a filter-family by calculating the respective index p of the filter-family as:

$$p = \mod_N[\text{Floor}(m \cdot Q/P)] \quad \text{Equation 7:}$$

In this case, filter constructor 90 copies the coefficients of the N family sub-filters of the selected filter-family into respective coefficients of the interpolated sub-filters of Polyphase filter bank 78. The digital receiver then proceeds in filtering the samples in memory buffer 70 using the updated sub-filters $h_0 \ldots h_{N-1}$, applying cyclic shifting and IFFT as described above.

The storage area required for storing the P filter-families 88 increases linearly with P. As a result, a digital receiver design that requires a rational rate-conversion ratio P1/Q1 with large integers P and Q, requires large memory area accordingly.

In some embodiments, to reduce the storage area required for the super filter bank, the desired rate-conversion ratio α=P1/Q1 (P1 and Q1 are large coprime integers) is approximated by a ratio P/Q for which P and Q are relatively small. For example, if the actual rate-conversion ratio is α=20/31 (P1=20, Q1=31), α can be approximated by the ratio 2/3 (P=2, Q=3). Since P1=10·P, the storage area for the filter-families in this case is reduced by 90%. A similar approach can be adopted for α that is an irrational number. For example, for α=(1/√2)≈50/71, an approximate ratio can be selected as 5/7, i.e., P=5, Q=7.

The configurations of CMTS 20 and digital receiver 40 shown in FIGS. 1 and 2 are example configurations, which are chosen purely for the sake of conceptual clarity. In alternative embodiments, any other suitable CMTS and digital receiver configurations can be used.

The division of functions among FE module 32, digital receiver 40 and slice processor 48 may differ from the division shown in FIG. 1. The FE module, digital receiver and slice processor may be integrated in a single device (e.g., on a single silicon die) or implemented in separate devices (e.g., separate silicon dies). Further alternatively, processing chains 24 can be implemented in separate devices of integrated into one or more devices.

The different elements of digital receiver 40 may be implemented using suitable hardware, such as in one or more Application-Specific Integrated Circuits (ASICs) or Field-Programmable Gate Arrays (FPGAs). Memory buffer 70 may be implemented using any suitable type of memory, e.g., Random Access Memory (RAM).

In some embodiments, some elements of digital receiver 40, e.g., filter constructor 90 or IFFT module 82, can be implemented using software, or using a combination of hardware and software elements. Elements of digital receiver 40 that are not mandatory for understanding of the disclosed techniques have been omitted from the figure for the sake of clarity.

In some embodiments, some of the functions of digital receiver 40 may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the elements of digital receiver 40 excluding memory buffer 70 are referred to collectively as "circuitry." In the example of FIG. 2, the circuitry comprises sampler 74, super filter bank 84, Polyphase filter bank 78, filter constructor 90, cyclic buffer 80 and IFFT module 82.

Figure 3:
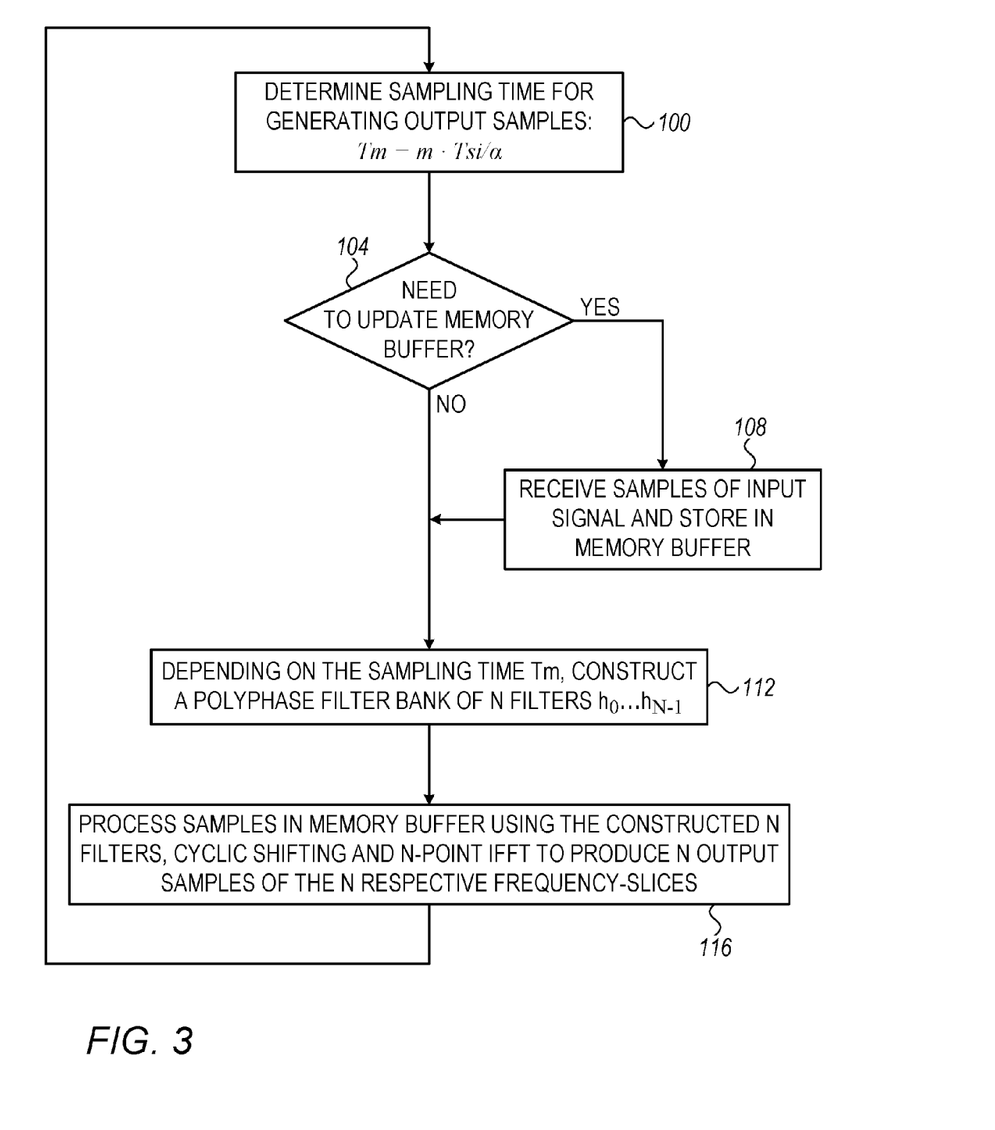
FIG. 3 is a flow chart that schematically illustrates a method for simultaneous extraction of multiple signals corresponding to frequency-slices of a broadband signal at an arbitrary rate-conversion ratio, in accordance with an embodiment that is described herein.

FIG. 3 is a flow chart that schematically illustrates a method for simultaneous extraction of multiple signals corresponding to frequency-slices of a broadband signal at an arbitrary rate-conversion ratio, in accordance with an embodiment that is described herein.

The method is described as being executed by digital receiver 40 of FIGS. 1 and 2. In describing the method we make the following assumptions:

The input sampling rate Fsi, the desired output sampling rate Fso, the number N of frequency-slices and the number of filter-families P are predetermined design parameters.

The rate-conversion ratio α=Fso/Fsi is an irrational number, or a rational number P1/Q1 wherein P1 is different from the number of filter-families P. Typically P is much smaller than P1, therefore resulting in a much smaller storage area, as described above.

A prototype LPF—Hprototype has been designed with a normalized stopband frequency α/(2·P)=1/(2·Q), using any suitable filter design method. The normalized stopband frequency α/(2·P) is given by way of example and is not mandatory. Alternatively, any other suitable normalized stopband frequency can also be used. The number of coefficients in Hprototype is N·L·P, wherein L is selected to meet certain design constrains such as ripple and/or attenuation in the passband and stopband of the filter. In some embodiments, Hprototype is designed with a normalized stopband frequency that is larger than 1/(2·Q), in which case the transition band of the prototype LPF folds into itself. Further alternatively, a normalized stopband frequency smaller than 1/(2·Q) can also be used. In this case filtering operations that are typically carried out in slice processor 48 may be incorporated, instead, in the prototype LPF of the digital receiver.

N·P family sub-filters of the P filter-families have been derived from the prototype filter, as described above, and stored in super filter bank 84.

Note that designing Hprototype with a length of N·L·P coefficients is given by way of example. In alternative embodiments, the length of Hprototype is not necessarily a multiple of (N·P). For example, the length of the prototype LPF is given by $L \cdot [L_0 + L_1 + \ldots L_{P-1}]$, and each filter-family (indexed by p) comprises N family sub-filters of length Lp. In one embodiment of this sort, the family sub-filters are each zero-padded to a common length L. Alternatively, the family sub-filters in each filter-family may have different respective lengths Lp, and the convolution calculation in Equation 2a above changes accordingly.

The method begins by sampler 74 of the digital receiver determining a sampling time Tm for producing output samples at a sampling step 100. In an embodiment, Tm is a multiple of (Tsi/α) as given in Equation 1 above.

At a buffer updating check step 104, the digital receiver checks whether the memory buffer needs to be updated. Checking for buffer update can be carried out using any suitable method. In an example embodiment, the digital receiver checks whether the sampling times corresponding to sampling indices (m−1) and m fall in different Tsi intervals, and if so, the digital receiver decides that updating the memory buffer is required. When at step 104 the digital receiver decides to update the memory buffer, the digital receiver receives one or more input samples and stores the received samples in the memory buffer, at a reception step 108. Otherwise, the method proceeds to a filter construction step 112.

In some embodiments, the memory buffer is updated with a single input sample at a time, i.e., X(n) is input to the memory buffer at time n·Tsi. Independently, sample 74 determines the output sampling times Tm, for calculating N output samples $Y_0(m) \ldots Y_{N-1}(m)$.

At step 112, based on the sampling time Tm of step 100, filter constructor 90 selects two or more filter-families from super filter bank 84, constructs from the family sub-filters of the selected filter-families N interpolated sub-filters $h_0 \ldots h_{N-1}$ of the Polyphase filter bank and loads the constructed filters into the respective N interpolated sub-filters of Polyphase filter bank 78. Note that occasionally Tm may be aligned to a time corresponding to one of the filter-families p', i.e., Tm=Tsi·(n+p'/P). In this case, no interpolation is required, and the relevant filter-family can be loaded into the Polyphase filter-bank. In an alternative embodiment, filter constructor 90 interpolates the interpolated sub-filters by assigning zero weight to family sub-filters of selected filter-families p that are unaligned with Tm (i.e., p≠p').

In some embodiments, the single filter-family p' is selected and loaded into the Polyphase filter bank when Tm is not equal to but is sufficiently close to Tsi·(n+p'/P). For example, Tm may be close to Tsi·(n+p'/P) within ±Tsi/(10·P).

At an output step 116, the digital receiver applies the N interpolated sub-filters that were constructed (or selected) at step 112 to the samples in the memory buffer as given in Equations 2a and 2b. The digital receiver further applies cyclic shifting as given in Equations 3 and 4, and IFFT as given in Equation 5. The output of step 116 comprises N samples of respective N frequency-slices centered at k·Fsi/N, shifted to baseband. Following step 116 the method loops back to step 100 to determine a subsequent sampling time.

The interpolated sub-filters constructed at step 112 are aligned to the sampling time determined at step 100. The digital receiver can construct the N interpolated sub-filters of the Polyphase filter bank using any suitable method, such as, by interpolating among family sub-filters of multiple filter-families using any suitable interpolation method.

Consider, for example, a sampling time Tm that occurs at an offset of (i+Δ)/P time units from Tsi·Floor(m/α), wherein Δ<1. In an embodiment, the digital receiver selects the filter-families having indices i and i+1, and interpolates between the respective family sub-filters of the selected filter-families using linear interpolation with respective weights (1−Δ) and Δ, as given by:

$$h_j = (1-\Delta)\underline{h}_j^{(i)} + \Delta \underline{h}_j^{(i+1)} \qquad \text{Equation 8:}$$

In Equation 8, the two selected filter-families correspond to sampling times that respectively occur before and after the sampling time. In some embodiments, when interpolating the family sub-filters of more than two filter-families, the interpolated filter-families contain a filter-family corresponding to a time that occurs before the sampling time and another filter-family corresponding to a time that occurs after the sampling time. Alternatively, all of the family-filters selected for the interpolation correspond to respective times that all occur before or after the sampling time.

The embodiments described above are given by way of example, and other suitable embodiments can also be used. For example, although in the embodiments above we mainly refer to a digital receiver that simultaneously extracts N frequency-slices that are separated by a frequency difference Fsi/N, in alternative embodiments, the digital receiver may extract a single frequency-slice or multiple frequency-slices at arbitrary center frequencies.

In the embodiments described above, the digital receiver typically calculates the interpolated sub-filters of the Polyphase filter bank once per N-sized output sample. In alternative embodiments, the digital receiver determines multiple output sampling times ahead, and calculates in advance, multiple respective versions of interpolated sub-filters of the Polyphase filter bank to be used at the respective output sampling times.

Although in the embodiments described above we mainly refer to extracting frequency-slices with down-sampling, the disclosed techniques are applicable mutatis mutandis to extracting frequency-slices with up-sampling.

Although the embodiments described herein mainly address processing cable modem signals, the methods and systems described herein can also be used in other applications, such as in satellite communication, processing wideband signals such as radio signals and broadcast TV signals (digital or analog), and for measuring various spectral metrics. The disclosed techniques are generally applicable for any type of communication and/or signal processing application that requires separating among multiple narrowband signals carried within a wideband signal.

In the embodiments described above, we mainly assume that the sub-filters of the P filter-families are derived from a common prototype LPF. In alternative embodiments, multiple prototype LPFs can be defined and used for deriving the P filter-families. In an example embodiment, odd-indexed and even-indexed filter-families are derived from two different prototype LPFs. The design parameters of the multiple prototype LPFs, such as, for example, the stopband frequency and the stopband attenuation of the different prototype LPFs may differ up to a (typically small) predefined difference.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital receiver, comprising:
  a memory buffer, configured to store samples of an input signal having a sampling rate Fsi; and
  circuitry, comprising P filter-families that each comprises N filters, wherein the N filters are derived from a prototype Low-Pass Filter (LPF) whose stopband frequency depends on a predefined output sampling rate Fso, wherein Fso=α·Fsi, and α being a predefined rate-conversion ratio, and wherein the circuitry is configured to:
    set a sampling time according to the output sampling rate Fso;
    based on the sampling time, select two or more filter-families out of the P filter-families, and based on the N filters in each of the two or more filter-families construct respective N interpolated filters that are each aligned to the sampling time;

calculate N filtered samples by applying the N interpolated filters to at least some of the samples in the memory buffer; and generate a sample for an output signal of a frequency-slice of the input signal, by digitally down-converting the N filtered samples.

2. The digital receiver according to claim 1, wherein the circuitry is configured to compute coefficients of the N interpolated filters (i) after setting the sampling time and (ii) as a function of the sampling time.

3. The digital receiver according to claim 1, wherein $\alpha$ is an irrational number.

4. The digital receiver according to claim 1, wherein $\alpha$ equals a rational number P1/Q1, P1 and Q1 being integer numbers, and P1 is different from P.

5. The digital receiver according to claim 1, wherein the circuitry is configured to generate N samples of respective N frequency-slices each centered at a frequency $k \cdot Fsi/N$, k being an integer in a range 0 ... N−1, by producing N cyclically-shifted samples from the N filtered samples, and down-converting the N cyclically-shifted samples to baseband.

6. The digital receiver according to claim 5, wherein the circuitry is configured to produce the N cyclically-shifted samples by calculating a cyclic shift value as a function of the sampling time.

7. The digital receiver according to claim 1, wherein the circuitry is configured to construct the N interpolated filters by selecting first and second filter-families corresponding to first and second sampling times that respectively occur before and after the sampling time.

8. The digital receiver according to claim 7, wherein the circuitry is configured to construct the N interpolated filters by interpolating between coefficients of the respective N filters in each of the first and second filter-families, depending on an offset of the sampling time from the first sampling time.

9. A method comprising:

storing samples of an input signal in a memory buffer of a digital receiver, which comprises P filter-families that each comprises N filters, wherein the N filters are derived from a prototype Low-Pass Filter (LPF) whose stopband frequency depends on a predefined output sampling rate Fso, wherein $Fso = \alpha \cdot Fsi$, Fsi is a sampling rate of the input signal to the digital receiver and $\alpha$ being a predefined rate-conversion ratio;

setting, by the digital receiver, a sampling time according to the output sampling rate Fso;

based on the sampling time, selecting two or more filter-families out of the P filter-families, and based on the N filters in each of the two or more filter-families constructing respective N interpolated filters that are each aligned to the sampling time;

calculating N filtered samples by applying the N interpolated filters to at least some of the samples in the memory buffer; and generating a sample for an output signal of a frequency-slice of the input signal, by digitally down-converting the N filtered samples.

10. The method according to claim 9, wherein constructing the N interpolated filters comprises computing coefficients of the N interpolated filters (i) after setting the sampling time and (ii) as a function of the sampling time.

11. The method according to claim 9, wherein $\alpha$ is an irrational number.

12. The method according to claim 9, wherein $\alpha$ equals a rational number P1/Q1, P1 and Q1 being integer numbers, and P1 is different from P.

13. The method according to claim 9, wherein generating the sample of the output signal generating N samples of respective N frequency-slices each centered at a frequency $k \cdot Fsi/N$, k being an integer in a range 0 ... N−1, by producing N cyclically-shifted samples from the N filtered samples, and down-converting the N cyclically-shifted samples to baseband.

14. The method according to claim 13, wherein producing the N cyclically-shifted samples comprises calculating a cyclic shift value as a function of the sampling time.

15. The method according to claim 9, wherein constructing the N interpolated filters comprises selecting first and second filter-families corresponding to first and second sampling times that respectively occur before and after the sampling time.

16. The method according to claim 15, wherein constructing the N interpolated filters comprises interpolating between coefficients of the respective N filters in each of the first and second filter-families, depending on an offset of the sampling time from the first sampling time.

* * * * *